(12) United States Patent
Sugioka et al.

(10) Patent No.: US 10,647,170 B2
(45) Date of Patent: May 12, 2020

(54) TIRE PRESSURE DETECTION SYSTEM INCLUDING AIR PRESSURE DETECTION DEVICE AND LITHIUM SECOND BATTERY

(71) Applicant: MAXELL HOLDINGS, LTD., Kyoto (JP)

(72) Inventors: Yu Sugioka, Kyoto (JP); Megumu Takai, Kyoto (JP); Noriyuki Yabushita, Kyoto (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 107 days.

(21) Appl. No.: 15/757,542

(22) PCT Filed: Mar. 9, 2017

(86) PCT No.: PCT/JP2017/009466
§ 371 (c)(1),
(2) Date: Mar. 5, 2018

(87) PCT Pub. No.: WO2017/155035
PCT Pub. Date: Sep. 14, 2017

(65) Prior Publication Data
US 2018/0244115 A1    Aug. 30, 2018

(30) Foreign Application Priority Data

Mar. 9, 2016  (JP) .................................. 2016-045882
Dec. 16, 2016 (JP) .................................. 2016-244253

(51) Int. Cl.
*B60C 23/04* (2006.01)
*H01M 10/052* (2010.01)
(Continued)

(52) U.S. Cl.
CPC ........ *B60C 23/041* (2013.01); *B60C 23/0411* (2013.01); *B60C 23/0413* (2013.01);
(Continued)

(58) Field of Classification Search
USPC .................................................. 73/146–146.8
See application file for complete search history.

(56) References Cited

U.S. PATENT DOCUMENTS 5,998,063 A    12/1999  Kobayashi et al.
6,194,998 B1 *  2/2001  Huang .................. B60C 23/041
                                                           340/442

(Continued)

FOREIGN PATENT DOCUMENTS

JP    8-21305 A      8/1996
JP    2005-186930 A  7/2005
(Continued)

OTHER PUBLICATIONS

Extended European Search Report, dated Jun. 27, 2018, for European Application No. 17763375.7.
(Continued)

*Primary Examiner* — Andre J Allen
(74) *Attorney, Agent, or Firm* — Birch, Stewart, Kolasch & Birch, LLP (57) ABSTRACT

Provided is a tire pressure detection system that can be operated stably for a long period of time by using, as a power source, a secondary battery having little characteristic deterioration under a high temperature environment, e.g. in a situation in which the battery is maintained for a long period of time in a fully charged state under a high temperature environment, while having excellent low temperature characteristics. A tire pressure detection system 1 includes: an air pressure detection device 10 that detects an air pressure inside a tire; and a secondary battery 20 that supplies power to the air pressure detection device 10. The secondary battery 20 is a lithium secondary battery that includes a negative electrode containing a lithium alloy as an active material and a positive electrode.

10 Claims, 4 Drawing Sheets

(51) Int. Cl.
*H01M 4/505* (2010.01)
*H01M 2/04* (2006.01)
*H01M 2/16* (2006.01)
*H01M 4/46* (2006.01)
*H01M 10/04* (2006.01)
*H01M 10/0569* (2010.01)

(52) U.S. Cl.
CPC ....... *H01M 2/0413* (2013.01); *H01M 2/1653* (2013.01); *H01M 4/463* (2013.01); *H01M 4/505* (2013.01); *H01M 10/0427* (2013.01); *H01M 10/052* (2013.01); *H01M 10/0569* (2013.01); *B60C 23/0494* (2013.01); *H01M 2220/20* (2013.01); *Y02E 60/122* (2013.01)

(56) References Cited

U.S. PATENT DOCUMENTS

| | | | |
|---|---|---|---|
| 10,038,227 B2 * | 7/2018 | Kim | H01M 10/052 |
| 2003/0162100 A1 | 8/2003 | Takahashi et al. | |
| 2005/0134444 A1 | 6/2005 | Park et al. | |
| 2007/0159315 A1 * | 7/2007 | Murata | B60C 23/0416 |
| | | | 340/447 |
| 2008/0131766 A1 * | 6/2008 | Yoshida | B60C 23/041 |
| | | | 429/162 |
| 2008/0166631 A1 | 7/2008 | Takahashi et al. | |
| 2008/0291002 A1 * | 11/2008 | Katou | B60C 23/041 |
| | | | 340/442 |
| 2009/0102633 A1 * | 4/2009 | Ebinuma | B60C 23/0408 |
| | | | 340/442 |
| 2011/0316290 A1 | 12/2011 | Kobayakawa | |
| 2014/0118134 A1 | 5/2014 | Won | |
| 2014/0212770 A1 * | 7/2014 | Abe | H01M 10/0525 |
| | | | 429/331 |
| 2015/0243942 A1 * | 8/2015 | Takahashi | H01M 2/08 |
| | | | 429/185 |
| 2016/0197376 A1 * | 7/2016 | Koshiba | H01M 4/5825 |
| | | | 429/188 |
| 2016/0211557 A1 * | 7/2016 | Kim | H01M 10/052 |
| 2017/0069940 A1 * | 3/2017 | Goldstein | H01M 2/24 |
| 2018/0294118 A1 * | 10/2018 | Furuuchi | G01M 3/16 |

FOREIGN PATENT DOCUMENTS

| | | |
|---|---|---|
| JP | 2005-324748 A | 11/2005 |
| JP | 2011-230597 A | 11/2011 |
| JP | 2014-160660 A | 9/2014 |
| JP | 2014-161220 A | 9/2014 |
| JP | 2015-81018 A | 4/2015 |

OTHER PUBLICATIONS

International Search Report, issued in PCT/JP2017/009466, dated Jun. 6, 2017.

* cited by examiner

TIRE PRESSURE DETECTION SYSTEM INCLUDING AIR PRESSURE DETECTION DEVICE AND LITHIUM SECOND BATTERY

TECHNICAL FIELD

The present invention relates to a tire pressure detection system that includes an air pressure detection device for detecting an air pressure inside a tire and a secondary battery for supplying power to the air pressure detection device.

BACKGROUND ART

Along with the recent increase in the amount of traffic of vehicles, there have been some cases where tires of traveling vehicles puncture and cause serious accidents. Accordingly, it becomes important to properly keep the air pressure of tires of vehicles to prevent serious accidents.

In the United States, there are legal regulations for safety of tires to ensure safety during the travel of vehicles, and new motor vehicles must be equipped with a tire pressure monitoring system (TPMS). Some European countries and South Korea as well as the United States have already established legal regulations for safety of tires, and China and India are expected to start such legal regulations within a few years.

The tire pressure monitoring system is arranged inside a tire and requires a power source for driving. Primary batteries such as coin-type lithium primary batteries are generally used as the power source. However, when primary batteries are used as the power source of the tire pressure monitoring system, the batteries are exhausted if an operation time is long, and they need to be replaced.

To cope with this, as a configuration that does not require the replacement of batteries, a configuration is known in which power is generated by piezoelectric elements, solar batteries, electromagnetic induction or the like, and the power obtained thereby is supplied to the system, as indicated by Patent Documents 1 to 3, for example.

Meanwhile, as indicated by Patent Document 4, for example, a configuration is known in which a lithium-ion secondary battery is used as part of the power source of the system. In the configuration disclosed in Patent Document 4, power generated by a power generation device is accumulated in the secondary battery.

PRIOR ART DOCUMENTS

Patent Documents

Patent Document 1: JP 2005-186930 A
Patent Document 2: JP 2011-230597 A
Patent Document 3: JP 2014-161220 A
Patent Document 4: JP 2015-081018 A

DISCLOSURE OF INVENTION

Problem to be Solved by the Invention

As to the configurations disclosed in Patent Documents 1 to 3 that include a power generation element (e.g., piezoelectric elements, solar batteries) and that do not include a power storage element to accumulate power obtained by the power generation, the needed amount of power is not always obtained by the power generation element. For example, power necessary to operate the tire pressure monitoring system sometimes cannot be obtained in the stopped state of vehicles, bad weather and the like. The tire pressure monitoring system having the configuration only equipped with the power generation element may malfunction depending on the power generation condition of the power generation element.

As to the configuration disclosed in Patent Document 4 in which the lithium-ion secondary battery is used as the power source of the tire pressure monitoring system, the above problem occurring in the case of using only the power generation element is resolved but another problem, deterioration of the lithium-ion secondary battery, arises. Specifically, when the lithium-ion secondary battery is placed inside a tire under a high-temperature and high-humidity environment for a long period of time, battery characteristics deteriorate easily if the configuration of the lithium-ion secondary battery is the same as those of lithium-ion secondary batteries for use in general devices.

Moreover, as to the configuration disclosed in Patent Document 4 in which power generated by the power generation device is accumulated in the secondary battery, there is a case where the battery is charged irregularly. For example, in a configuration in which a piezoelectric element that is attached to a tire generates power in response to the deformation of the tire, charging from the piezoelectric element to the secondary battery continues for a long time if a vehicle travels for a long time. This may cause, e.g., a situation in which the secondary battery is being fully charged for a long period of time or overcharged by trickle charging or float charging under a high temperature environment, resulting in the deterioration of characteristics of the secondary battery.

The secondary batteries are also required to be operable under low temperature atmospheres at −20° C. or lower for outdoor use. Because of this, it is necessary to apply secondary batteries capable of coping with a wide range of temperatures from low temperature to high temperature, to the system.

It is an object of the present invention to provide a tire pressure detection system that can be operated stably for a long period of time by using, as a power source, a secondary battery having little characteristic deterioration under a high temperature environment, e.g. in a situation in which the battery is maintained for a long period of time in a fully charged state under a high temperature environment, while having excellent low temperature characteristics.

Means for Solving Problem

A tire pressure detection system according to one embodiment of the present invention is a tire pressure detection system arranged inside a tire. The tire pressure detection system includes: an air pressure detection device that detects an air pressure inside the tire; and a secondary battery that supplies power to the air pressure detection device. The secondary battery is a lithium secondary battery that includes a negative electrode containing a lithium alloy as an active material and a positive electrode.

Effects of the Invention

As a power source of the tire pressure detection system to be used under a severe high temperature condition inside a tire, a lithium secondary battery containing a lithium alloy as a negative electrode active material is used. By doing so, characteristic deterioration of the battery under a high temperature environment is reduced as compared with the case of using general lithium-ion secondary batteries containing graphite as a negative electrode active material. Therefore, it is possible to continuously charge the secondary battery under a severe high temperature condition inside a tire and operate the tire pressure detection system stably for a long period of time even if the secondary battery is maintained in a fully charged state.

Moreover, by reducing the characteristic deterioration of the secondary battery under a high temperature environment as described above, load characteristics of the secondary battery at low temperatures improve. Thereby, it is possible to operate the tire pressure detection system also under severe low temperature environments, e.g., in mid-winter.

DESCRIPTION OF THE INVENTION

Hereinafter, the embodiments of the present invention will be described specifically with reference to the drawings. In the drawings, the same components or corresponding parts are denoted with the same reference numerals, and the explanation will not be repeated.

(Entire Configuration)

Figure 1:
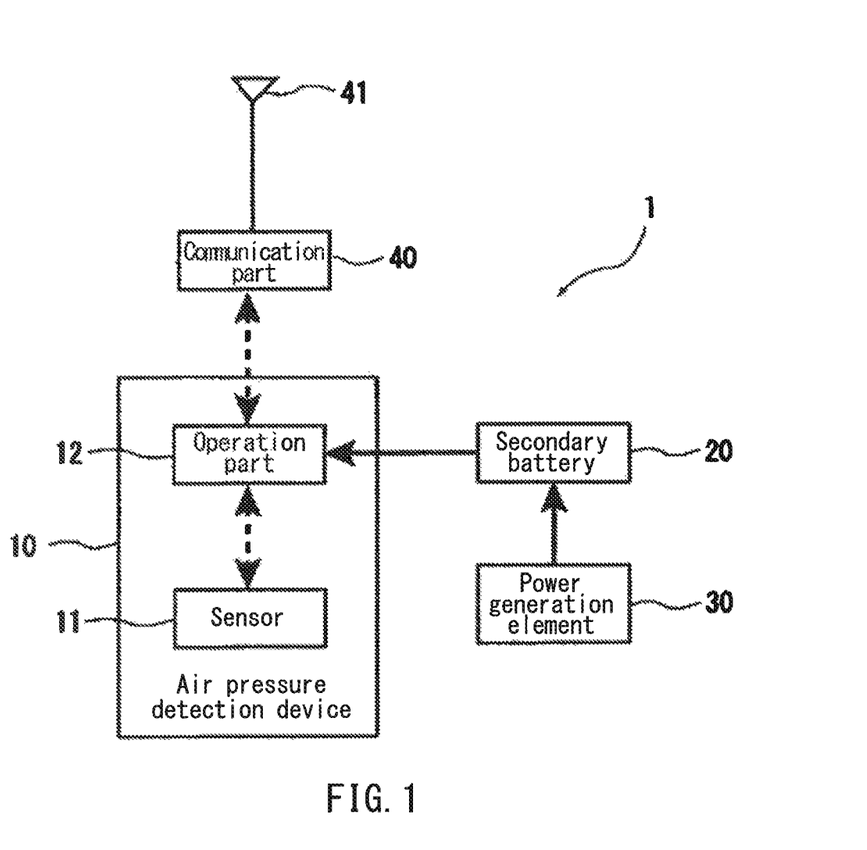
FIG. 1 is a block diagram illustrating a schematic configuration of a tire pressure detection system according to an embodiment of the present invention.

FIG. 1 is a block diagram illustrating a schematic configuration of a tire pressure detection system 1 according to an embodiment of the present invention. In FIG. 1, solid arrows indicate power transfer, and dashed arrows indicate signal transfer.

Figure 2:
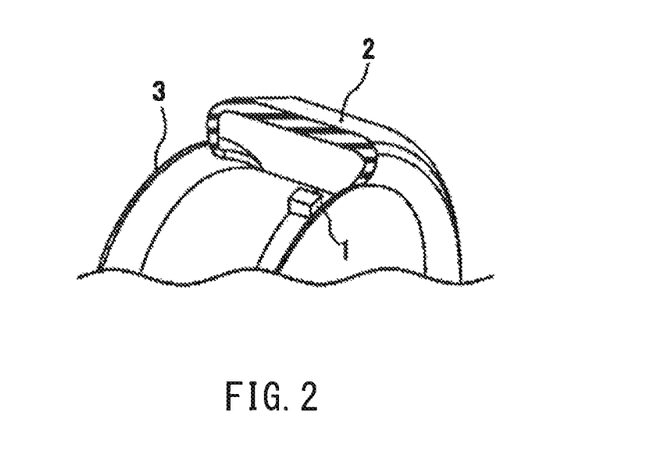
FIG. 2 is a view schematically illustrating a state in which the tire pressure detection system is mounted inside a tire.

The tire pressure detection system 1 measures the air pressure inside a tire 2 of a vehicle. For example, the tire pressure detection system 1 is arranged inside the tire 2 of a vehicle as illustrated in FIG. 2. In an example illustrated in FIG. 2, the tire pressure detection system 1 is mounted on a wheel 3. However, the mounting position is not limited thereto, and it may be mounted anywhere inside the tire 2. In FIG. 2, part of the tire 2 is illustrated in cross section for explanation.

As illustrated in FIG. 1, the tire pressure detection system 1 includes an air pressure detection device 10, a secondary battery 20, a power generation element 30, a communication part 40, and an antenna 41. In the tire pressure detection system 1 of this embodiment, the air pressure detection device 10, the secondary battery 20, the power generation element 30, the communication part 40, and the antenna 41 are contained in a casing (not illustrated). Incidentally, any of the air pressure detection device 10, the secondary battery 20, the power generation element 30, the communication part 40, and the antenna 41 may be contained in different casings.

The air pressure detection device 10 detects the air pressure inside the tire 2. Specifically, the air pressure detection device 10 has a sensor 11 and an operation part 12. For example, the sensor 11 is a pressure sensor that can measure an air pressure. Any sensor that can at least detect an air pressure may be used for the configuration of the sensor 11. The sensor 11 constantly or periodically outputs measurement data as to the air pressure inside the tire 2 as a detection signal.

The operation part 12 calculates the air pressure inside the tire 2 based on the detection signal output from the sensor 11. The air pressure (air pressure data) calculated by the operation part 12 is transmitted via the communication part 40 and the antenna 41 to a control device (not illustrated) of a vehicle.

The communication part 40 transmits the air pressure data wirelessly via the antenna 41 to the control device of the vehicle. Any wireless communication method can be used as the wireless communication method of the communication part 40.

The secondary battery 20 supplies power to the air pressure detection device 10. The secondary battery 20 is a lithium secondary battery containing a lithium alloy as a negative electrode active material. The detailed configuration of the secondary battery 20 will be described later.

As power for charging the secondary battery 20, for example, power supplied utilizing wireless power feeding, power generated by the power generation element 30 or the like can be used.

Although not illustrated particularly, in the case of supplying power to the secondary battery 20 utilizing the wireless power feeding, for example, a power reception coil receives a power waveform supplied from a power transmission coil, and the power received is supplied to the secondary battery 20. Thereby, the secondary battery 20 is charged.

In the case of supplying power generated by the power generation element 30 to the secondary battery, the power generation element 30 is, e.g., a piezoelectric element or an element utilizing electromagnetic induction.

When the power generation element 30 is a piezoelectric element, the power generation element 30 is, e.g., a plate member made from a piezoelectric material. The plate member is fixed to the tire 2 only on its one side in the longitudinal direction. Thereby, the plate member principally deforms in the thickness direction according to the rotation of the tire 2, and thus power is generated according to the deformation of the plate member.

When the power generation element 30 is an element utilizing electromagnetic induction, the power generation element 30 includes, e.g., a coil fixed to the tire 2 and a magnet arranged in the axial direction with respect to the coil. The magnet is provided so that it can vibrate in the axial direction of the coil. In this configuration, the magnet vibrates according to the rotation of the tire 2 and changes a magnetic field, thereby generating power.

In addition to the configurations described above, the power generation element 30 may be an element utilizing electrostatic induction or an inverse magnetostriction effect.

When the power generation element 30 is an element utilizing electrostatic induction, the power generation element 30 includes, e.g., two metal plates arranged parallel to each other in the tire 2. In response to the vibration according to the rotation of the tire 2, at least one of the metal plates can be displaced in the thickness direction. Therefore, in this configuration, an electric field generated between the two metal plates is changed, thereby generating power.

When the power generation element 30 is an element utilizing an inverse magnetostriction effect, for example, a plate member made from a magnetostriction material is fixed to the tire 2 only on its one side in the longitudinal direction, similarly to the case of the piezoelectric element. The plate member principally deforms in the thickness direction according to the rotation of the tire 2. Thus, power is generated according to the deformation of the plate member.

(Secondary Battery)

Next, the configuration of the secondary battery 20 in one aspect will be described using FIG. 3. The secondary battery 20 includes a bottomed cylindrical positive electrode can (outer can) 110, a negative electrode can (sealing can) 120 that covers an opening of the positive electrode can 110, a gasket 130 that is placed between an inner surface of the positive electrode can 110 and an outer surface of the negative electrode can 120, and a power generation part 140 that is contained in a space formed between the positive electrode can 110 and the negative electrode can 120. The secondary battery 20 as a whole is flat like a coin by uniting the positive electrode can 110 and the negative electrode can 120. In the space formed between the positive electrode can 110 and the negative electrode can 120 of the secondary battery 20, an electrolyte such as non-aqueous electrolyte (not illustrated) is sealed in addition to the power generation part 140.

The positive electrode can 110 is made of a metal material such as stainless and formed into a bottomed cylindrical shape by press molding. The positive electrode can 110 has a circular bottom 111 and a cylindrical surrounding wall 112 that is formed continuously to the bottom 111 at the outer periphery of the bottom 111. The surrounding wall 112 extends perpendicular to the bottom 111 in the longitudinal sectional view. The positive electrode can 110 is caulked to the outer periphery of the negative electrode can 120 by folding an opening end of the surrounding wall 112 inward, with the gasket 130 being interposed between the positive electrode can 110 and the negative electrode can 120 (described later).

Similarly to the positive electrode can 110, the negative electrode can 120 is made of a metal material such as stainless and formed into a bottomed cylindrical shape by press molding. The negative electrode can 120 has a circular planar part 121 and a cylindrical surrounding wall 122 that is formed continuously to the planar part 121 at the outer periphery of the planar part 121. Similarly to the positive electrode can 110, the surrounding wall 122 extends perpendicular to the planar part 121 in the longitudinal sectional view. The surrounding wall 122 has a diameter enlarged part 122b whose diameter is increased stepwise relative to a base end part 122a of the surrounding wall 122. In other words, the surrounding wall 122 has a step 122c between the base end part 122a and the diameter enlarged part 122b. As illustrated in FIG. 3, the opening end of the surrounding wall 112 of the positive electrode can 110 is folded and caulked to the step 122c. Thereby, the secondary battery 20 is sealed.

The gasket 130 is interposed between the surrounding wall 112 of the positive electrode can 110 and the surrounding wall 122 of the negative electrode can 120.

It is preferred that the gasket 130 is made of a heat-resistant resin having a melting point or a heat decomposition temperature of 200° C. or more for obtaining favorable sealing properties at high temperatures. Examples of the heat-resistant resin include polyamide, fluororesin such as PFA (tetrafluoroethylene-perfluoroalkyl vinyl ether copolymer), polyphenylene ether (PEE), polysulfone (PSF), polyarylate (PAR), polyethersulfone (PES), polyphenylene sulfide (PPS), and polyether ether ketone (PEEK).

In order to prevent water from entering into the battery, a glass hermetic seal may be used instead of the gasket.

The power generation part 140 includes a positive electrode (electrode material) 141 obtained by molding a positive electrode active material and the like into a disk shape, a negative electrode 142 obtained by forming a lithium alloy (negative electrode active material) into a disk shape, and a separator 143 made of a nonwoven fabric. As illustrated in FIG. 3, the positive electrode 141 is arranged inside the positive electrode can 110, whereas the negative electrode 142 is arranged inside the negative electrode can 120. The separator 143 is arranged between the positive electrode 141 and the negative electrode 142.

The negative electrode 142 contains a lithium alloy as an active material. The lithium alloy is an alloy of lithium and an element that can be alloyed with lithium, such as Al, Si, Sn, or In. However, the lithium alloy may include additional elements such as Fe, Ni, Co, Mn, Cr, V, Ti, Zr, Nb, and Mo as alloy components to improve the strength.

The lithium alloy may have a dual phase configuration having a phase of an element (metal) that cannot be alloyed with lithium, such as Fe, Ni, Co, or Ti, and a phase of a lithium alloy. For example, the lithium alloy may be an alloy having a phase of an intermetallic compound that cannot be alloyed with lithium, such as a Si—Ni alloy or a Si—Ti alloy, and a phase of a lithium alloy.

Further, the lithium alloy may be prepared by reacting lithium with a uniform amorphous alloy containing an element that can be alloyed with lithium and an element that cannot be alloyed with lithium.

The negative electrode 142 can be constituted using powder or a foil of the lithium alloy formed in advance. For example, the negative electrode 142 may be constituted by forming a mixture layer by binding the lithium alloy powder with a resin binder. The negative electrode 142 may also be constituted by uniting the mixture layer with a current collector.

Alternatively, the lithium alloy can be obtained during or after the assembly of the battery instead of forming the lithium alloy in advance, by reacting lithium with an element (metal) that can be alloyed with lithium.

For example, the lithium alloy obtained in the following manner may also be used as the negative electrode 142. A lithium layer (layer containing lithium) constituted by, e.g., a metal lithium foil and a metal layer constituted by, e.g., an aluminum foil and containing an element for forming a lithium alloy are laminated by pressure bonding or the like to prepare a laminate. The laminate thus obtained is brought into contact with a non-aqueous electrolyte inside the battery to form a lithium alloy. In the case of using such a negative electrode, by adjusting the ratio between the lithium layer and the metal layer, part of the lithium layer or the metal layer does not cause a reaction and remains as it is.

Specifically, when the ratio of the lithium layer to the metal layer is set to be greater than or equal to a certain ratio, part of the lithium layer does not react with the metal layer and remains as it is. Thus, it is possible to form a negative electrode that is a laminate of the lithium layer and a lithium alloy layer. When the ratio of the metal layer to the lithium layer is set to be greater than or equal to a certain ratio, part of the metal layer does not react with the lithium layer and remains as it is. Thus, it is possible to form a negative electrode that is a laminate of a lithium alloy layer and the metal layer.

In the case where the negative electrode 142 is a laminate of the lithium layer and a lithium alloy layer, the ratio of lithium in the negative electrode 142 is high, which can increase the capacity of the negative electrode. In the case where the negative electrode 142 is a laminate of a lithium alloy layer and the metal layer, the metal layer remaining may relax the distortion during charging and discharging of the negative electrode 142, thereby improving the durability of the negative electrode 142 in charging and discharging for a long period of time.

The negative electrode 142 may include a negative electrode current collector as needed. The negative electrode current collector may be made of a material (metal base) that cannot be alloyed with lithium, such as copper, nickel, iron, or stainless steel. Examples of the form of the negative electrode current collector include a plainly woven metal net, an expanded metal, a lath net, a punched metal, a metal foam, and a foil (plate). Further, the negative electrode 142 may be a laminate (clad material) in which a metal foil (plate) that can be alloyed with lithium is joined and united to the surface of the negative electrode current collector made of a foil (plate). After assembly of the battery using the clad material, the metal that can be alloyed with lithium reacts with lithium by charging of the battery, thereby forming a lithium alloy. In this manner, a negative electrode that is a laminate in which the current collector layer and the lithium alloy layer are joined is obtained.

As described above, part of the metal that can be alloyed with lithium may remain in the lithium alloy layer.

By constituting the negative electrode using the clad material, the electrical contact between the negative electrode current collector and the negative electrode active material layer (metal layer containing the lithium alloy) can be maintained favorably. Therefore, it is possible to prevent a contact failure between the negative electrode current collector and the negative electrode active material layer due to vibration in the case of arranging the tire pressure detection system 1 of this embodiment inside the tire 2.

In order to enhance current collecting properties, the thickness of the negative electrode current collector is preferably 5 μm or more, more preferably 10 μm or more, and particularly preferably 15 μm or more.

Meanwhile, in order to avoid the capacity drop of the negative electrode 142, the thickness of the negative electrode current collector is preferably 100 μm or less, more preferably 50 μm or less, and particularly preferably 30 μm or less.

In order to maintain the capacity of the negative electrode 142 at a predetermined level or more, the thickness of the metal layer is preferably 15 μm or more, more preferably 20 μm or more, and particularly preferably 30 μm or more.

Meanwhile, in order to balance the capacity between the negative electrode 142 and the positive electrode 141, the thickness of the metal layer is preferably 1 mm or less, more preferably 300 μm or less, and particularly preferably 100 μm or less.

Further, the lithium layer (layer containing lithium) may be a foil (or plate) made of Li (containing inevitable impurities), or a foil (or plate) made of a Li alloy containing additional elements such as Fe, Ni, Co, Mn, Cr, V, Ti, Zr, Nb, Mo, Sn, and Si as alloy components.

The thickness of the lithium layer is adjusted appropriately depending on the thickness of the metal layer containing an element for forming a lithium alloy.

The percentage of Li in the active material (active material layer) in the negative electrode 142 at full charge is preferably 1 mass % or more, more preferably 5 mass % or more, and particularly preferably 10 mass % or more, in order to keep the discharged capacity of the negative electrode 142 to be greater than or equal to a certain value. The reaction surface of the metal layer becomes fine at the time when the metal layer containing an element for forming a lithium alloy and Li are being alloyed. Therefore, load characteristics of the secondary battery 20, particularly at low temperatures, improve as the percentage of Li in the negative electrode 142 increases. However, the increase of the surface area of the negative electrode 142 due to the alloying may deteriorate heat resistance and vibration resistance of the secondary battery 20. Therefore, the percentage of Li in the active material (active material layer) is preferably 20 mass % or less, more preferably 18 mass % or less.

Meanwhile, the positive electrode 141 may be, e.g., a molded body obtained by molding a mixture (positive electrode mixture) containing a positive electrode active material, a conductive assistant, a binder, etc., into pellets, or a laminate in which a layer (positive electrode mixture layer) made of the positive electrode mixture is formed on one side or both sides of a current collector.

The positive electrode active material is preferably a manganese oxide or a lithium-manganese composite oxide. The manganese oxide is particularly preferably a manganese dioxide. Preferable examples of the lithium-manganese composite oxide include an oxide having a spinel structure expressed as $LiMn_2O_4$, an oxide having a layered structure expressed as $Li_2MnO_3$ or $LiMnO_2$, an oxide in which Li is inserted into a manganese dioxide, and a low crystallinity oxide that can be synthesized at a comparatively low temperature and that is expressed by a composition formula such as $LiMn_3O_6$.

Moreover, the positive electrode active material may be, e.g., a solid solution type oxide expressed as $(1-x)Li_2MnO_3$-$xLiMO_2$ (M is a metal element such as Co, Ni, or Mn), or an oxide in which part of elements of the above oxide is substituted with elements other than Mn such as Co, Ni, Cr, Fe, Ti, Zr, Mg, Al, and Mo, including an oxide expressed as $LiMn_{1-y-z}Co_yNi_zO_2$.

In addition to the above, the positive electrode active material may be an oxide or composite oxide constituted by elements other than Mn, and examples of which include lithium cobalt oxides (e.g., $LiCoO_2$), lithium nickel oxides (e.g., $LiNiO_2$), lithium titanates (e.g., $Li_{4/3}Ti_{5/3}O_4$), and lithium-nickel-cobalt-aluminum composite oxides (e.g., $LiNi_{0.8}Co_{0.15}Al_{0.05}O_2$) in which part of elements of the above oxide is substituted with other elements. The positive electrode active material may be a compound other than oxides, and examples of the compound include compounds having an olivine structure (e.g., $LiFePO_4$, $LiCoPO_4$, $LiNiPO_4$, $LiMnPO_4$).

Among the above-mentioned positive electrode active materials, when the positive electrode active material of a secondary battery is a manganese dioxide, or an oxide in which Li is inserted into a manganese dioxide, or a low crystallinity oxide expressed by a composition formula such as $LiMn_3O_6$, the operation potential of the secondary battery is about 3 to 3.5 V. When the positive electrode active material of a secondary battery is an active material such as a lithium cobalt oxide, the operation potential of the secondary battery is about 4V. Therefore, by using the manganese dioxide, the oxide in which Li is inserted into a manganese dioxide, the low crystallinity oxide expressed by a composition formula such as $LiMn_3O_6$ or the like as the positive electrode active material of a secondary battery, it is possible to prevent the characteristic deterioration of the secondary battery due to overcharge and high temperature environments, as compared with the case of using an active material such as a lithium cobalt oxide as the positive electrode active material of the secondary battery.

The positive electrode 141 may contain a plurality of active materials from the above-mentioned active materials as the positive electrode active materials.

Examples of the binder to be contained in the positive electrode mixture include: fluororesins such as polyvinylidene fluoride, polytetrafluoroethylene, and polymer of hexafluoride propylene; and acrylic resins. The above examples of the binder to be contained in the positive electrode mixture may be used individually or in combination of two or more.

Generally, the positive electrode mixture contains a conductive assistant. Examples of the conductive assistant to be contained in the positive electrode mixture include flake graphite, acetylene black, Ketjen black, and carbon black. The above examples of the conductive assistant to be contained in the positive electrode mixture may be used individually or in combination of two or more.

It is preferable that the composition of the positive electrode mixture includes the positive electrode active material in an amount of 80 to 98.2 mass %, the binder in an amount of 0.3 to 10 mass %, and the conductive assistant in an amount of 1.5 to 10 mass %.

When the positive electrode 141 is a molded body made of the positive electrode mixture, for example, the positive electrode 141 is obtained by mixing a positive electrode active material, a binder, a conductive assistant, etc., to prepare a positive electrode mixture, and molding the positive electrode mixture into a predetermined shape by pressure molding. When the positive electrode 141 is a molded body in the form of a pellet, the molded body may be combined with a metallic ring-shaped base (positive electrode ring) to prepare a positive electrode, or pressure bonded to a current collector such as a net (described later) to prepare a positive electrode. As illustrated in FIG. 3, the positive electrode 141 of this embodiment is a molded body in the form of a pellet, which is preferably used in combination with a positive electrode ring 144 from the viewpoint of maintaining the shape of the positive electrode.

When the positive electrode 141 includes a positive electrode mixture layer and a current collector such as a metal foil, the positive electrode 141 may be obtained, for example, in the following manner. First, a positive electrode active material, a binder, a conductive assistant, etc., are dispersed in an organic solvent such as water or N-methyl-2-pyrrolidone (NMP) to prepare a positive electrode mixture-containing composition (e.g., slurry or paste). Incidentally, the binder may be dissolved in a solvent. The positive electrode mixture-containing composition is applied to the positive electrode current collector and dried, followed by press treatment such as calendaring as needed to obtain a positive electrode.

When the positive electrode current collector is used in the positive electrode 141 as described above, examples of the material for the positive electrode current collector include stainless steels such as SUS 316, SUS 430 and SUS 444, and aluminum. Examples of the form of the positive electrode current collector include a plainly woven metal net, an expanded metal, a lath net, a punched metal, a metal foam, and a foil (plate). It is preferred that the thickness of the positive electrode current collector is, e.g., 0.01 to 0.2 mm. Moreover, it is preferred that a pasty conductive material such as a carbon paste or a silver paste is applied to the surface of the positive electrode current collector.

The positive electrode 141 is not limited to those produced by the above-mentioned methods, and may be produced by other methods.

When the positive electrode 141 is the molded body of the positive electrode mixture as described above, the thickness of the positive electrode 141 is preferably 0.15 mm or more from the viewpoint of maintaining the shape. At the same time, the thickness of the positive electrode 141 is preferably 2 mm or less from the viewpoint of enhancing load characteristics.

When the positive electrode 141 has a positive electrode mixture layer and a positive electrode current collector, the thickness of the positive electrode mixture layer (thickness of the positive electrode current collector per one side) is preferably 50 to 300 µm.

The positive electrode ring 144, which covers part of the bottom surface and the side surface of the positive electrode 141, is attached to the positive electrode 141 to hold the positive electrode 141. The positive electrode ring 144 may be made of stainless steel with certain rigidity conductivity. The positive electrode ring 144 has a cylindrical part 144a and an annular flange 144b. The cylindrical part 144a contacts the side surface of the positive electrode 141. The annular flange 144b extends from one end of the cylindrical part 144a toward the inner side of the cylindrical part 144a and contacts the bottom surface of the positive electrode 141. The cylindrical part 144a and the flange 144b are formed integrally.

The positive electrode ring 144 having the above-mentioned configuration can regulate deformation of the positive electrode 141 inside the positive electrode ring 144 in the radial direction and to one end side. Moreover, since the other end of the cylindrical part 144a of the positive electrode ring 144 is not provided with a flange, the positive electrode 141 can freely expand to the other end side of the cylindrical part 144a of the positive electrode ring 144 during discharging. Therefore, even if the thickness of the negative electrode 142 is reduced during discharging, the positive electrode 141 expands to the negative electrode 142 side along the positive electrode ring 144, thereby preventing the separation of the positive electrode 141 and the negative electrode 142.

The separator 143 may be a nonwoven fabric or a microporous film (microporous membrane). The material of the separator 143 may be polyolefin such as polyethylene (PE), polypropylene (PP), or an ethylene-propylene copolymer. In order to improve the heat resistance of the battery, similarly to the gasket, it is preferred that the separator is made of a heat-resistant resin having a melting point or a heat decomposition temperature of 200° C. or more. Examples of the heat-resistant resin include: fluororesins such as tetrafluoroethylene-perfluoroalkoxy ethylene copolymer (PFA); polyolefins having a high melting point (polyolefins having a melting temperature of, e.g., 200° C. or more measured in accordance with the requirements of JIS K 7121 using a differential scanning calorimeter) such as polyphenylene sulfide (PPS), polyether ether ketone (PEEK), polybutylene terephthalate (PBT), and polymethylpentene; polyimides; and aramids.

The above examples of the material of the nonwoven fabric and the microporous film may be used individually or in combination of two or more. The separator 143 may have a single layer structure composed of the nonwoven fabric or the microporous film made of the material exemplified above, or may have a laminated structure composed of a plurality of nonwoven fabrics or microporous films made of different materials, which are laminated, for example.

The thickness of the separator 143 is preferably 500 µm or less, more preferably 450 µm or less, from the viewpoint of preventing a decrease in energy density of the secondary battery 20. However, when the separator 143 is too thin, the function of preventing short circuit may decrease. Therefore, in the case of using the nonwoven fabric as the separator 143, the thickness of the separator 143 is preferably 20 µm or more, more preferably 100 µm or more, and particularly preferably 150 µm or more. In the case of using the microporous film as the separator 143, the thickness of the separator 143 is preferably 10 µm or more, more preferably 15 µm or more.

The electrolyte may be, e.g., a non-aqueous electrolyte adjusted by dissolving a lithium salt in a non-aqueous solvent below.

Examples of the non-aqueous solvent include: cyclic carbonates such as ethylene carbonate (EC), propylene carbonate (PC), and butylene carbonate (BC); chain carbonates such as dimethyl carbonate (DMC), diethyl carbonate (DEC), methylethyl carbonate (MEC); ethers such as 1,2-dimethoxyethane (DME), diglyme (diethylene glycol dimethyl ether), triglyme (triethylene glycol dimethyl ether), tetraglyme (tetraethylene glycol dimethyl ether), methoxyethoxy ethane, 1,2-diethoxyethane, and tetrahydrofuran (THF); cyclic esters such as γ-butyrolactone (γ-BL); and nitriles. The above examples of the non-aqueous solvent may be used individually or in combination of two or more. Particularly, it is preferable to use the cyclic carbonate and the chain carbonate or ether in combination as the non-aqueous solvent.

When the cyclic carbonate and the chain carbonate or ether are used in combination as the non-aqueous solvent, it is preferable to adjust a ratio (mixing ratio) of the amount of the cyclic carbonate to the total amount of the chain carbonate and ether in the whole solvent (the amount of the cyclic carbonate: the total amount of the chain carbonate and ether) to be 30:70 to 70:30 in a volume ratio.

Examples of the lithium salt includes $LiBF_4$, $LiPF_6$, $LiAsF_6$, $LiSbF_6$, $LiClO_4$, $LiC_nF_{2n+1}SO_3$ (n≥1) [$LiCF_3SO_3$, $LiC_2F_5SO_3$, $LiC_4F_9SO_3$, etc.], $Li_2C_2F_4(SO_3)_2$, lithium imide salts [e.g., $LiN(FSO_2)_2$, $LiN(CF_3SO_2)_2$, $LiN(C_2F_5SO_2)_2$], $LiC(CF_3SO_2)_3$, $LiCF_3CO_2$, $LiB_{10}Cl_{10}$, lower fatty acid lithium carboxylate, $LiAlCl_4$, LiCl, LiBr, LiI, chloroborane lithium, and tetraphenyl lithium borate. At least one selected from these lithium salts is used.

Among these lithium salts, it is preferable to use at least one selected from the group consisting of $LiBF_4$, $LiClO_4$, $LiN(CF_3SO_2)_2$ [LiTFSI], and $LiCF_3SO_3$ [LiTf]. Thereby, battery characteristics under a high temperature environment can be maintained more favorably.

The concentration of the lithium salt in the non-aqueous electrolyte (i.e., the concentration of the lithium salt in the case of using only one kind, or the total concentration of the lithium salts in the case of using two or more kinds in combination) is preferably 0.3 mol/l or more, more preferably 0.4 mol/l or more. The concentration is preferably 1.5 mol/l or less, more preferably 1.2 mol/l or less, and further preferably 1 mol/l or less.

Additives such as vinylene carbonates, 1,3-propanesultone, 1,3-propenesultone, diphenyl disulfide, cyclohexylbenzene, biphenyl, fluorobenzene, and t-butylbenzene can also be added to the electrolyte as appropriate for the purpose of further improving various characteristics of a battery.

Further, the electrolyte may also be made into a gel (gel-like electrolyte) by using a gelling agent such as a known polymer.

Further, it is preferable to use nitrile as the non-aqueous solvent. Since nitrile has low viscosity and high permitivity, the use of nitrile as the non-aqueous solvent can further improve load characteristics of the secondary battery 20.

Specific examples of the nitrile include mononitriles such as acetonitrile, propionitrile, butyronitrile, valeronitrile, benzonitrile, and acrylonitrile; dinitriles such as malononitrile, succinonitrile, glutaronitrile, adiponitrile, 1,4-dicyanoheptane, 1,5-dicyanopentane, 1,6-dicyanohexane, 1,7-dicyanoheptane, 2,6-dicyanoheptane, 1,8-dicyanooctane, 2,7-dicyanooctane, 1,9-dicyanononane, 2,8-dicyanononane, 1,10-dicyanodecane, 1,6-dicyanodecane, and 2,4-dimethylglutaronitrile; cyclic nitriles such as benzonitrile; and alkoxy-substituted nitriles such as methoxyacetonitrile.

When nitrile is used as the non-aqueous solvent, the content of nitrile in the total amount of solvent is preferably 1 vol % or more, more preferably 2 vol % or more, and particularly preferably 3 vol % or more from the viewpoint of favorably obtaining the above effect by nitrile. However, since nitrile is highly reactive with Li of the negative electrode, it is preferable that the usage amount of nitrile is reduced to some extent to prevent excessive reaction with Li. Therefore, the content of nitrile in the total amount of solvent is preferably 20 vol % or less, more preferably 17 vol % or less.

It is preferable that the non-aqueous electrolyte contains an additive that can form a protective coating on the surface of the negative electrode. Examples of the additive include: cyclic sultones such as propanesultone and propenesultone; organic boron salts such as $LiB(C_2O_4)_2$; fluorinated cyclic carbonates such as fluoroethylene carbonate; sulfides such as diphenyl disulfide; acid anhydrides such as maleic anhydride; vinylene carbonates; vinylethylene carbonates; and phosphoric acid compounds and boric acid compounds having, in the molecule, a group represented by General Formula (1) below. By adding such additives to the non-aqueous electrolyte, the high temperature storage characteristics of the secondary battery 20 can be improved further.

[Chemical Formula 1]

(1)

(In General Formula (1) above, X is Si, Ge or Sn, $R^1$, $R^2$ and $R^3$ independently represent an alkyl group having 1 to 10 carbon atoms, an alkenyl group having 2 to 10 carbon atoms, or an aryl group having 6 to 10 carbon atoms, and some or all of hydrogen atoms may be substituted with a fluorine atom.)

Examples of the phosphoric acid compounds and the boric acid compounds include mono(trimethylsilyl) phosphate, di(trimethylsilyl) phosphate, tris(trimethylsilyl) phosphate, dimethyltrimethylsilyl phosphate, methyl bis(trimethylsilyl) phosphate, diethyltrimethylsilyl phosphate, diphenyl (trimethylsilyl) phosphate, tris(triethylsilyl) phosphate, tris (vinyldimethylsilyl) phosphate, tris(triisopropylsilyl) phosphate, tris(dimethylethylsilyl) phosphate, tris(methyldiethylsilyl) phosphate, tris(butyldimethylsilyl) phosphate, tris(vinyldimethylsilyl) phosphate, tris(triphenylsilyl) phosphate, mono(trimethylsilyl) borate, di(trimethylsilyl) borate, tris(trimethylsilyl) borate, dimethyltrimethylsilyl borate, methyl bis(trimethylsilyl) borate, diethyltrimethylsilyl borate, diphenyl(trimethylsilyl) borate, tris(triethylsilyl) borate, tris(vinyldimethylsilyl) borate, tris(triisopropylsilyl) borate, tris(dimethylethylsilyl) borate, tris(methyldiethylsilyl) borate, tris(butyldimethylsilyl) borate, tris(vinyldimethylsilyl) borate, and tris(triphenylsilyl) borate.

Among these, mono(trimethylsilyl) phosphate, di(trimethylsilyl) phosphate, tris(trimethylsilyl) phosphate, dimethyltrimethylsilyl phosphate, methyl bis(trimethylsilyl) phosphate, mono(trimethylsilyl) borate, di(trimethylsilyl) borate, tris(trimethylsilyl) borate, dimethyltrimethylsilyl borate and methyl bis(trimethylsilyl) borate are preferred, and tris(trimethylsilyl) phosphate and tris(trimethylsilyl) borate are particularly preferred.

The content of the additive in the non-aqueous electrolyte is preferably 0.1 mass % or more, more preferably 0.3 mass % or more, further preferably 0.5 mass % or more, and particularly preferably 1 mass % or more from the viewpoint of obtaining the above-mentioned effects of the additive more favorably. If the amount of the additive to be used in the secondary battery 20 is excessively large, the coating to be formed on the surface of the negative electrode will be thick, and the internal resistance of the battery will increase. This may reduce the discharging characteristic of the secondary battery 20. Therefore, from the viewpoint of preventing such an increase in the internal resistance of the secondary battery 20, the content of the additive in the non-aqueous electrolyte is preferably 5 mass % or less, more preferably 3 mass % or less, further preferably 2 mass % or less, and particularly preferably 1.5 mass % or less.

EXAMPLES

The battery characteristics of secondary batteries having the above configuration were evaluated under a high temperature environment. The components of the batteries used in the evaluation were produced as described below.

Example 1

<Production of Positive Electrode>

An aqueous solution of lithium hydroxide and an electrolytic manganese dioxide of the beta and gamma mixed form were mixed so that the molar ratio of Li to Mn would be 1:3. The mixture was dried at 150° for two hours, mixed with a mortar, and baked at 400° C. in the atmosphere to synthesize a lithium-manganese composite oxide expressed by a composition formula: $LiMn_3O_6$.

The lithium-manganese composite oxide was washed with water and dried. The dried lithium-manganese composite oxide, carbon black (conductive assistant), and polytetrafluoroethylene (binder) were mixed at a mass ratio of 93:3:4 to produce a positive electrode mixture. The positive electrode mixture was filled inside a positive electrode ring that had been set in a given mold, and subjected to pressure molding to produce a discal positive electrode (molded body) having a thickness of 0.64 mm and a diameter of 16.0 mm.

<Production of Negative Electrode>

A metal Li foil having a thickness of 0.14 mm was punched into a circle 15.8 mm in diameter, and a metal Al plate (thickness: 0.24 mm) that had been punched into a circle 16.0 mm in diameter was adhered to one of surfaces of the circular metal Li foil to obtain a negative electrode laminate (negative electrode for battery assembly). Then, the laminate was pressure bonded to a plainly woven metal net (negative electrode current collector) made of stainless that had been spot welded to an inner bottom surface of a sealing can (negative electrode can), thereby being united with the metal net. In this manner, the laminate was fixed to the inner bottom surface of the negative electrode can.

<Preparation of Non-Aqueous Electrolyte>

$LiN(CF_3SO_2)_2$ was dissolved at a concentration of 1 mol/l in a mixed solvent containing propylene carbonate (PC) and methylethyl carbonate (MEC) at a volume ratio of 1=2 to prepare a non-aqueous electrolyte.

<Assembly of Battery>

Figure 3:
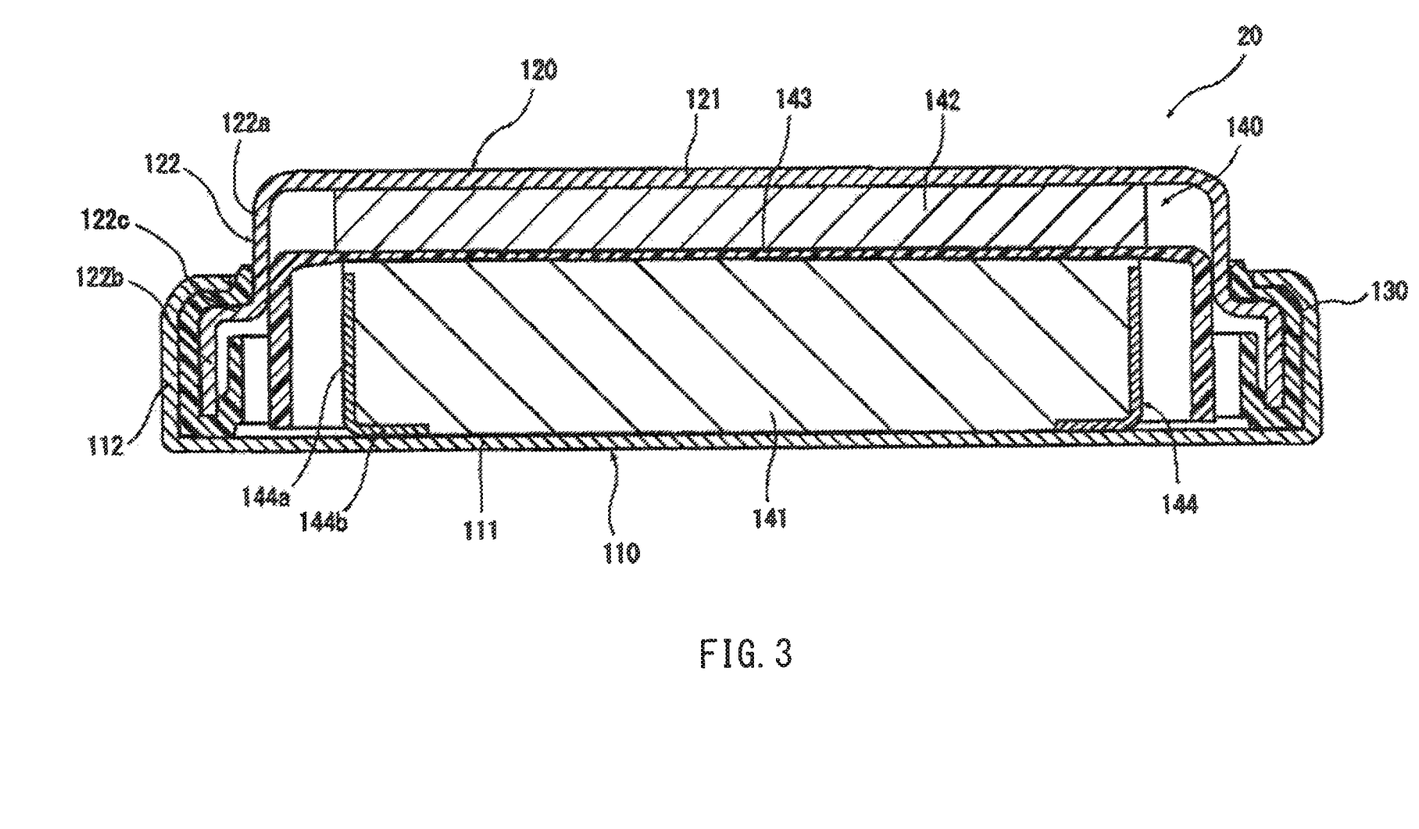
FIG. 3 is a cross-sectional view illustrating a schematic configuration of a secondary battery.

The positive electrode, the negative electrode, a separator (a nonwoven fabric made of polyphenylene sulfide having a thickness of 0.3 mm), and the non-aqueous electrolyte were placed inside a battery container composed of an outer can (positive electrode can), a negative electrode can, and a gasket to obtain a coin-type non-aqueous electrolyte secondary battery (diameter: 20.0 mm, thickness: 1.53 mm) having the structure illustrated in FIG. 3. As the gasket, a gasket made of polyphenylene sulfide (melting point: 280° C.) was used.

<Evaluation of Overcharge Characteristics at High Temperatures>

A resistor of 10 kΩ was connected in series to the battery obtained above to charge the battery at a voltage of 3.3 V under a room-temperature environment. The battery after charging was then discharged until the voltage dropped to 2.0 V, and a discharged capacity (initial capacity) of the battery at this time was measured. The discharged capacity was 30 mAh.

Next, an overcharge test was conducted by charging the battery continuously for 20 days at a voltage of 3.3 V via a resistor of 10 kΩ under an environment of 60° C. After the overcharge test, the battery was left for one hour under a room-temperature environment and discharged until the voltage dropped to 2.0 V, and then a discharged capacity (capacity after overcharge) of the battery at this time was measured. The discharged capacity was 32 mAh.

This result shows that the battery characteristics of the battery having the configuration of this example hardly deteriorated even when the overcharged state was continued by power supplied from the power generation element. Therefore, by using the battery having the configuration of this example as a power source of the tire pressure detection system to be used under a severe high temperature condition, it is possible to stably operate the system for a long period of time.

Example 2

$LiBF_4$ was dissolved at a concentration of 1.2 mold in a mixed solvent containing propylene carbonate (PC) and methylethyl carbonate (MEC) at a volume ratio of 1:2, and tris(trimethylsilyl) phosphate was added thereto at a ratio of 1 mass % to prepare a non-aqueous electrolyte.

A coin-type non-aqueous electrolyte secondary battery of Example 2 was assembled in the same manner as in Example 1, except for the use of the above non-aqueous electrolyte.

Example 3

A coin-type non-aqueous electrolyte secondary battery of Example 3 was assembled in the same manner as in Example 2 except that tris(trimethylsilyl) phosphate was not added to the non-aqueous electrolyte.

<High Temperature Storage Test>

The batteries of Examples 2 and 3 were subjected to charging and discharging cycles, each cycle including: constant-current constant-voltage charging that combines charging at a constant current of 2 mA and charging at a constant voltage of 3.3 V (the charging was stopped when the current dropped to 0.1 mA); and discharging to drop the voltage of the battery to 2 V via a resistor of 10 kg. This charging and discharging cycle was repeated five times, and the discharged capacity at the fifth cycle was measured.

Further, the batteries to which the above discharged capacity measurement was conducted were charged under the above charging conditions. The batteries after charging were stored in a thermostat oven at 120° C. for six days. The batteries after storage were taken out and cooled to a room temperature, and the thicknesses of the batteries were measured. A change in the thicknesses of the batteries due to high temperature storage was determined by comparing the thicknesses before and after storage.

Thereafter, the discharged capacities of the batteries were measured by discharging the batteries until the voltage dropped to 2 V via a resistor of 10 kΩ. The ratio of the discharged capacity after the above discharging with respect to the discharged capacity before storage was determined as a capacity retention rate to evaluate a decrease in battery characteristics due to high temperature storage.

Table 1 shows the evaluation results of the decrease in battery characteristics due to high temperature storage.

TABLE 1

| | Results of high temperature storage test | |
|---|---|---|
| | Change in the thickness of battery (mm) | Capacity retention rate (%) |
| Example 2 | 0.03 | 93 |
| Example 3 | 0.11 | 51 |

As can be seen from Table 1, swelling and capacity drop of the battery of this example were avoided even when the battery in the charged state was placed under a severe high temperature environment at 120° C. for a long period of time. Therefore, the battery of this example can be suitably used as the power source of the tire pressure detection system. Particularly, by adding the phosphoric acid compound having, in the molecule, a group represented by the General Formula (1) to the non-aqueous electrolyte as the battery of Example 2, high temperature storage characteristics improve further. Therefore, the battery having the configuration of Example 2 is more suitably used for the above application.

Example 4

As a negative electrode, a clad material (laminated metal foil) was used in which Al foils each having a thickness of 20 μm were laminated on the both sides of a Cu foil having a thickness of 35 μm. The clad material was punched into a shape illustrated in FIG. 4 (diameter at an arc part: 16 mm), and three of them were prepared for battery assembly (described later).

Figure 4:
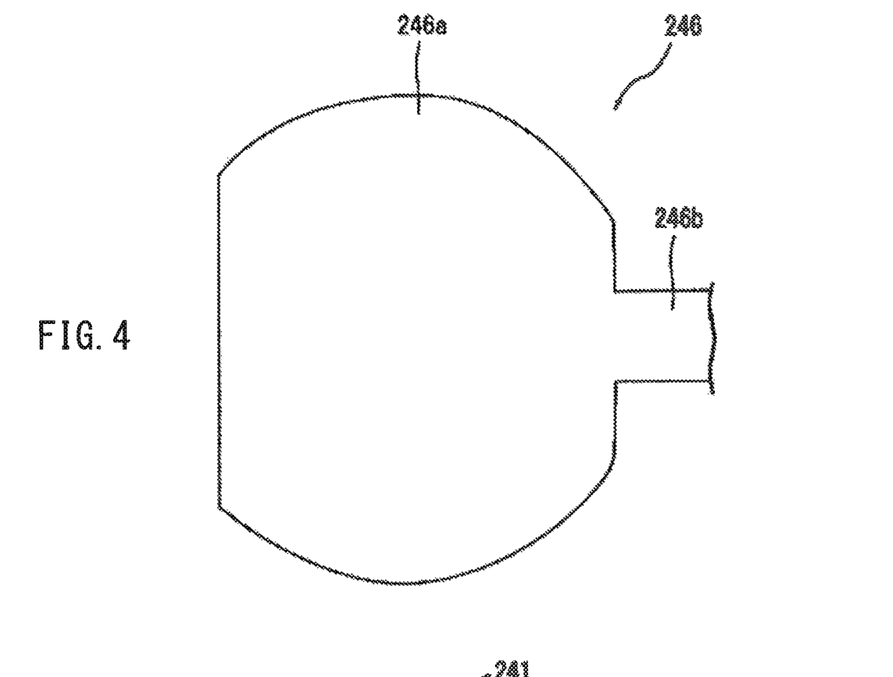
FIG. 4 is a plan view illustrating a schematic configuration of a clad material for forming a negative electrode of a secondary battery according to Example 4.

As illustrated in FIG. 4, a clad material 246 constituting the negative electrode includes a negative electrode body 246a, and a negative electrode tab 246b that protrudes from the body 246a and that is narrower than the body 246a.

A positive electrode was produced as follows. A slurry was prepared by dispersing, in NMP, 97 parts by mass of lithium cobalt oxide, 1.5 parts by mass of acetylene black (conductive assistant), and 1.5 parts by mass of PVDF (binder). The slurry was applied to one side or both sides of an Al foil (positive electrode current collector) having a thickness of 16 μm, followed by drying and press treatment to form a positive electrode mixture layer on the Al foil. In order to provide the Al foil with a positive electrode tab, the positive electrode mixture layer was not formed on part of both sides of the Al foil to create an exposed part of the Al foil.

Figure 5:
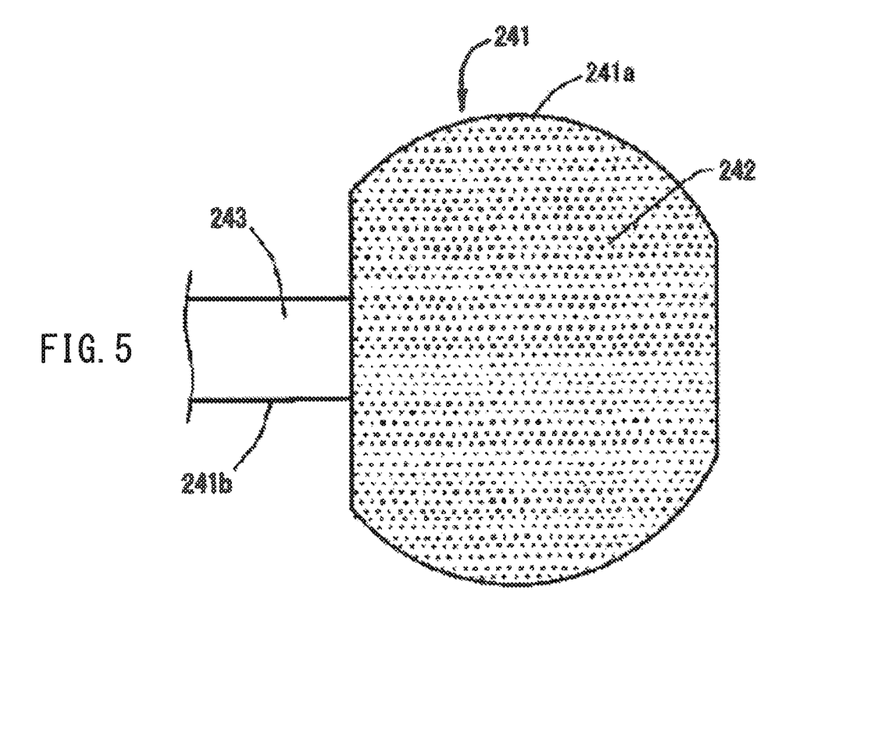
FIG. 5 is a plan view illustrating a schematic configuration of a positive electrode of the secondary battery according to Example 4.

Next, the Al foil on which the positive electrode mixture layer was formed was punched into a shape illustrated in FIG. 5 (diameter at an arc part: 15 mm). At this time, the Al foil with the positive electrode mixture layer was punched so that the exposed part of the Al foil would serve as a positive electrode tab 241b. Two positive electrodes in which the positive electrode mixture layers were formed on both sides of the Al foil and two positive electrodes in which the positive electrode mixture layer was formed on one side of the Al foil were prepared.

As illustrated in FIG. 5, a positive electrode 241 includes a positive electrode body 241a in which a positive electrode active material layer 242 is formed on one side or both sides of a positive electrode current collector 243, and the positive electrode tab 241b that protrudes from the body 241a and that is narrower than the body 241a.

Figure 6:
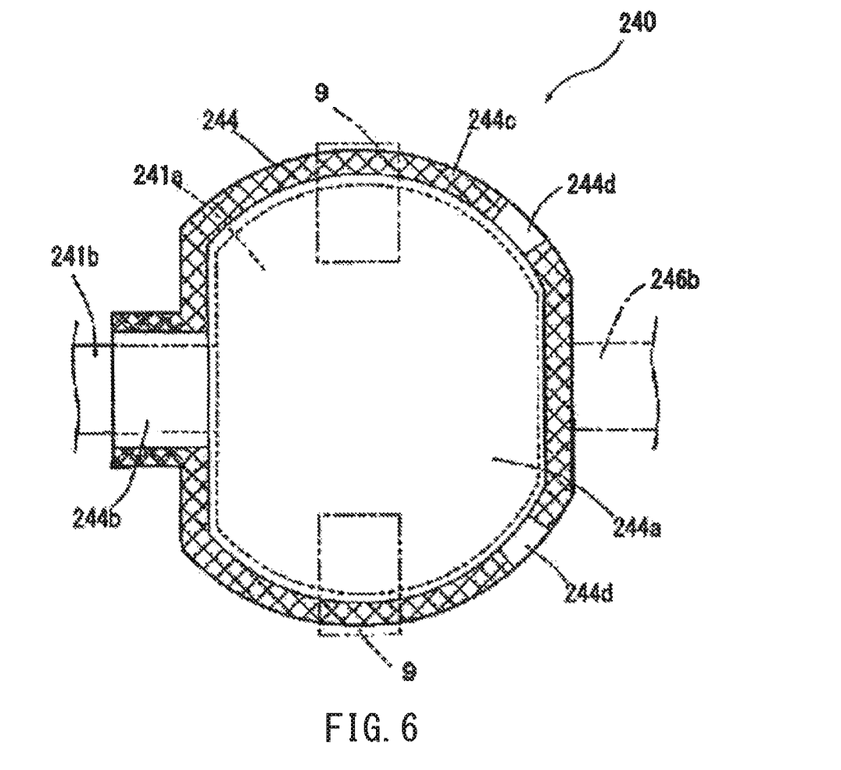
FIG. 6 is a plan view illustrating a schematic configuration of an electrode body of the secondary battery according to Example 4.

Microporous films (thickness: 30 μm) as separators 244 made of polyimide were arranged on both sides of the positive electrodes 241. The microporous films were partially adhered to each other at their peripheries 244c so as to be formed into a bag shape using an adhesive as illustrated in FIG. 6. Thereby, the positive electrode 241 and the separator 244 were united. Each of the separators 244 includes a main part 244a that covers the positive electrode body 241a of the positive electrode 241 and a projecting part 244b that covers the positive electrode tab 241b as illustrated in FIG. 6. FIG. 6 illustrates an electrode body 240 in which the positive electrodes 241 and separators 244 as well as the clad materials 246 for forming a negative electrode are laminated in the thickness direction. A reference numeral 244d in FIG. 6 indicates a non-welded part where the separators 244 are not welded to each other.

The clad materials 246 for forming a negative electrode and the positive electrodes 241 united with the separators 244 were laminated alternately so that the positive electrodes 241 in which the positive electrode mixture layer 242 was formed on one side of the Al foil as the positive electrode current collector 243 would be located on both ends of the laminate in the lamination direction. The laminate was fixed with a binding tape 9 to obtain the electrode body 240. The clad materials 246 for forming a negative electrode and the positive electrodes 241 united with the separators 244 were laminated in the thickness direction so that the negative electrode tabs 246b of the clad materials 246 for forming a negative electrode and the positive electrode tabs 241b of the positive electrodes 241 would be positioned opposite to each other in a plan view.

Figure 7:
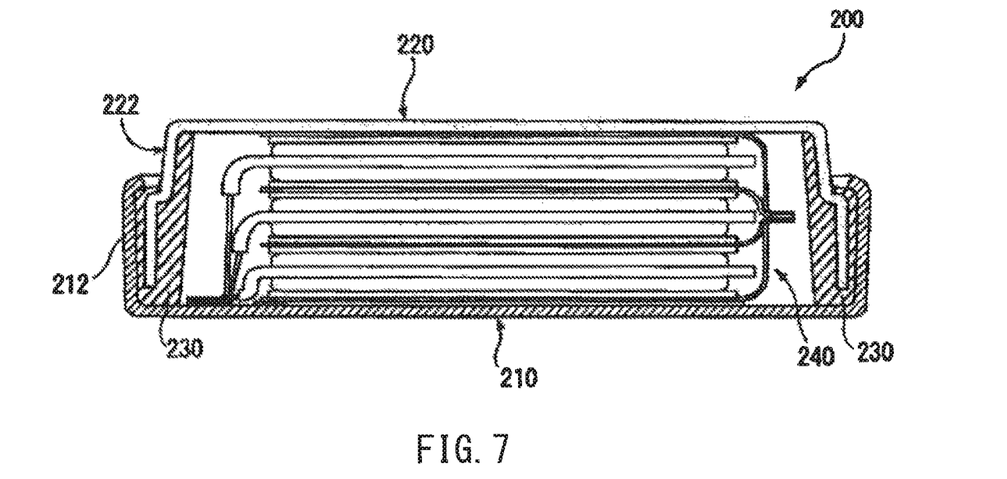
FIG. 7 is a cross-sectional view illustrating a schematic configuration of the secondary battery according to Example 4.

The negative electrode tabs 246b and the positive electrode tabs 241b were united by welding, and the electrode body 240 was placed inside a positive electrode can 210. Then, the united positive electrode tabs 241b of the electrode body 240 were welded to the inner surface of the positive electrode can 210.

Next, the united negative electrode tabs 246b of the electrode body 240 were welded to the inner surface of a negative electrode can 220 to which a gasket 230 made of polyphenylene sulfide was attached. Then, the non-aqueous electrolyte used in Example 2 was injected into the negative electrode can 220. The opening end of a surrounding wall 212 of the positive electrode can 210 was caulked to a surrounding wall 222 of the negative electrode can 220, with the positive electrode can 210 containing the electrode body 240 covering the negative electrode can 220, whereby the battery container was sealed. In this manner, a coin-type non-aqueous electrolyte secondary battery 200 was obtained.

Comparative Example 1

A negative electrode mixture paste was prepared by dispersing 94 parts by mass of graphite into a NMP solution in which 6 parts by mass of PVDF was dissolved. The negative electrode mixture paste was applied to both sides of a Cu foil having a thickness of 16 μm, followed by drying and press treatment to form negative electrode mixture layers. Next, the Cu foil on which the negative electrode mixture layers were formed was punched into the same shape as the clad material of Example 4 to produce negative electrodes.

$LiBF_4$ was dissolved at a concentration of 1.2 mol/l in a mixed solvent containing ethylene carbonate (EC) and methylethyl carbonate (MEC) at a volume ratio of 1:2, and tris(trimethylsilyl) phosphate was added thereto at a ratio of 1 mass % to prepare a non-aqueous electrolyte.

A coin-type non-aqueous electrolyte secondary battery of Comparative Example 1 was obtained in the same manner as in Example 4 except for the use of the negative electrodes containing graphite as the active material instead of the clad material of Example 4, the use of microporous films made of polyethylene as the separator, and the use of the above non-aqueous electrolyte.

The coin-type non-aqueous electrolyte secondary battery of Comparative Example 1 has the same configuration as universal lithium-ion secondary batteries.

The battery of Example 4 was subjected to constant-current constant-voltage charging that combines charging at a constant current of 2 mA and charging at a constant voltage of 4 V (the charging was stopped when the current dropped to 0.1 mA), and discharging at a constant current of 2 mA (discharge stop voltage: 2V). This charging and discharging cycle was repeated two times, and the discharged capacity at the second cycle was measured as an initial capacity.

The battery of Comparative Example 1 was subjected to constant-current constant-voltage charging that combines charging at a constant current of 2 mA and charging at a constant voltage of 4.2 V (the charging was stopped when the current dropped to 0.1 mA), and discharging at a constant current of 2 mA (discharge stop voltage: 2V). This charging and discharging cycle was repeated two times, and the discharged capacity at the second cycle was measured as an initial capacity.

<High Temperature Storage Test>

The batteries after the above initial capacity measurement were charged under the above charging conditions, and then stored in a thermostat oven at 120° C. for six days. The batteries after storage were taken out and cooled to a room temperature, and discharged with a constant current of 2 mA (discharge stop voltage: 2V).

The batteries after discharging were charged under the above charging conditions, and left to stand under an environment at −20° C. After the temperature of the batteries dropped, the batteries were discharged with a constant current of 20 mA (discharge stop voltage: 2V) to measure a discharged capacity at low temperature after the high temperature storage.

For each battery, the ratio of the discharged capacity at low temperature with respect to the initial capacity was calculated so as to evaluate load characteristics at low temperature after high temperature storage. Table 2 shows the evaluation results.

TABLE 2

| | Results of high temperature storage test Discharged capacity at low temperature (%) |
|---|---|
| Example 4 | 53 |
| Comparative Example 1 | 0 |

The characteristic deterioration of the battery of Example 4 was prevented even when the battery in the charged state was placed under a severe high temperature environment at 120° C. for a long period of time. Therefore, the battery of Example 4 has higher load characteristics at low temperature than the universal lithium-ion secondary battery containing graphite as the negative electrode active material. By using the battery of Example 4 as the power source of the tire pressure detection system, it is possible to operate the tire pressure detection system under severe low temperature environments, e.g., in mid-winter.

INDUSTRIAL APPLICABILITY

The tire pressure detection system of the present invention can be used in the case of, e.g., detecting the air pressure of tires of vehicles.

The invention claimed is:

1. A tire pressure detection system that is arranged inside a tire, comprising:
   an air pressure detection device that detects an air pressure inside the tire; and
   a secondary battery that supplies power to the air pressure detection device;
   wherein the secondary battery is a lithium secondary battery that comprises a negative electrode containing a lithium alloy as an active material and a positive electrode.

2. The tire pressure detection system according to claim 1, wherein the lithium secondary battery comprises a battery container comprising an outer can, a sealing can, and a gasket that is placed between the outer can and the sealing can.

3. The tire pressure detection system according to claim 1, wherein the positive electrode of the lithium secondary battery contains a manganese oxide or a lithium-manganese composite oxide as an active material.

4. The tire pressure detection system according to claim 1,
   wherein the lithium secondary battery further comprises a separator between the negative electrode and the positive electrode, and
   the separator is made of a heat-resistant resin having a melting point or a heat decomposition temperature of 200° C. or more.

5. The tire pressure detection system according to claim 1, wherein the lithium alloy is a lithium-aluminum alloy.

6. The tire pressure detection system according to claim 1, wherein the lithium secondary battery further comprises a non-aqueous electrolyte containing propylene carbonate as a solvent.

7. The tire pressure detection system according to claim 6, wherein the non-aqueous electrolyte contains at least one electrolyte salt selected from $LiClO_4$, $LiBF_4$, $LiCF_3SO_3$, $Li_2C_2F_4(SO_3)_2$, $LiC_2F_5SO_3$, $LiN(FSO_2)_2$, $LiN(CF_3SO_2)_2$, $LiC(CF_3SO_2)_3$, and $LiCF_3CO_2$.

8. The tire pressure detection system according to claim 1, wherein power supply to the lithium secondary battery for charging the lithium secondary battery is carried out by wireless power feeding or a power generation element.

9. The tire pressure detection system according to claim 2, wherein the gasket is made of a heat-resistant resin having a melting point or a heat decomposition temperature of 200° C. or more.

10. The tire pressure detection system according to claim 1, wherein the lithium secondary battery is a coin-type battery.

* * * * *